United States Patent
Kurokawa

(10) Patent No.: US 8,363,126 B2
(45) Date of Patent: Jan. 29, 2013

(54) IMAGING APPARATUS HAVING A ZOOM FUNCTION

(75) Inventor: Tomoyasu Kurokawa, Kokubunji (JP)

(73) Assignee: Casio Computer Co., Ltd., Tokyo (JP)

(*) Notice: Subject to any disclaimer, the term of this patent is extended or adjusted under 35 U.S.C. 154(b) by 282 days.

(21) Appl. No.: 12/727,713

(22) Filed: Mar. 19, 2010

(65) Prior Publication Data

US 2010/0245630 A1 Sep. 30, 2010

(30) Foreign Application Priority Data

Mar. 27, 2009 (JP) ................................. 2009-078176

(51) Int. Cl.
*H04N 5/262* (2006.01)
*H04N 5/222* (2006.01)

(52) U.S. Cl. .................................. 348/240.3; 348/333.12

(58) Field of Classification Search ............ 348/240.99, 348/240.1, 240.3, 333.03, 333.08, 333.11, 348/333.12, 218.1, 222.1
See application file for complete search history.

(56) References Cited

U.S. PATENT DOCUMENTS

| | | | | |
|---|---|---|---|---|
| 5,398,062 A * | 3/1995 | Hashimoto et al. | ...... | 348/333.02 |
| 5,557,328 A * | 9/1996 | Ishihama et al. | ........... | 348/240.3 |
| 5,754,230 A * | 5/1998 | Tsuruta | ................... | 348/333.12 |
| 5,867,217 A * | 2/1999 | Okino et al. | ............. | 348/240.99 |
| 6,819,357 B1 * | 11/2004 | Miyadera | ................... | 348/240.1 |
| 6,850,700 B2 * | 2/2005 | Kazami | ........................... | 396/60 |
| 7,053,953 B2 * | 5/2006 | Belz et al. | ....................... | 348/346 |
| 7,057,651 B2 * | 6/2006 | Niikawa | ....................... | 348/240.1 |
| 7,154,544 B2 * | 12/2006 | Kowno et al. | ........... | 348/240.99 |
| 7,221,395 B2 | 5/2007 | Kinjo | | |
| 7,305,180 B2 * | 12/2007 | Labaziewicz et al. | .......... | 396/60 |
| 7,319,811 B2 * | 1/2008 | Tojo et al. | ..................... | 386/239 |
| 7,327,890 B2 * | 2/2008 | Fredlund | ....................... | 382/218 |
| 7,362,966 B2 * | 4/2008 | Uchiyama | ....................... | 396/60 |
| 7,453,506 B2 * | 11/2008 | Li | ........................... | 348/333.12 |

(Continued)

FOREIGN PATENT DOCUMENTS

JP 2001-188179 A 7/2001
JP 2003-060970 A 2/2003

(Continued)

OTHER PUBLICATIONS

Japanese Office Action dated Jan. 19, 2011 (and English translation thereof) in counterpart Japanese Application No. 2009-078176.

*Primary Examiner* — John Villecco
*Assistant Examiner* — Selam Gebriel
(74) *Attorney, Agent, or Firm* — Holtz, Holtz, Goodman & Chick, PC

(57) ABSTRACT

In a digital camera, when the shutter is half-depressed, a controlling section 20 sequentially acquires current through-images imaged by an image acquiring section 10 which are wide-angle images imaged before zooming. Then, when a zoom operation is performed, the controlling section 20 holds a wide-angle image acquired at that point as a guidance image. Next, when the zoom magnification exceeds a predetermined magnification (for example, 3x), the controlling section 20 displays in a display section 25 the guidance image (wide-angle: low magnification) imaged before the zoom operation with a telephoto image imaged after the zoom operation. At the same time, a position corresponding to the current telephoto image is displayed to be identifiable within the guidance image. As a result, an imaging subject is easily confirmed when zooming is performed from wide-angle imaging to telephoto imaging.

13 Claims, 8 Drawing Sheets

U.S. PATENT DOCUMENTS

| | | | |
|---|---|---|---|
| 7,511,745 B2 * | 3/2009 | Aoyama | 348/240.2 |
| 7,710,468 B2 * | 5/2010 | Uchida et al. | 348/231.99 |
| 7,711,258 B2 * | 5/2010 | Yanagi | 396/88 |
| 7,738,016 B2 * | 6/2010 | Toyofuku | 348/240.1 |
| 7,848,575 B2 * | 12/2010 | Watanabe et al. | 382/192 |
| 7,907,189 B2 * | 3/2011 | Kyuma | 348/240.1 |
| 7,936,383 B2 * | 5/2011 | Yamamoto et al. | 348/240.1 |
| 2001/0013902 A1 * | 8/2001 | Kawabe | 348/358 |
| 2001/0040630 A1 * | 11/2001 | Matsuzaka | 348/240 |
| 2002/0154912 A1 * | 10/2002 | Koseki et al. | 396/429 |
| 2003/0016942 A1 * | 1/2003 | Tojo et al. | 386/46 |
| 2003/0160886 A1 * | 8/2003 | Misawa et al. | 348/347 |
| 2004/0174444 A1 * | 9/2004 | Ishii | 348/240.1 |
| 2005/0134709 A1 * | 6/2005 | Ishii et al. | 348/240.99 |
| 2007/0046804 A1 * | 3/2007 | Hirano et al. | 348/333.01 |
| 2007/0053068 A1 * | 3/2007 | Yamamoto et al. | 359/676 |
| 2007/0296837 A1 * | 12/2007 | Morita | 348/240.99 |
| 2008/0129857 A1 * | 6/2008 | Vau et al. | 348/345 |
| 2008/0211935 A1 * | 9/2008 | Kyuma | 348/240.1 |
| 2008/0239104 A1 * | 10/2008 | Koh | 348/240.99 |
| 2009/0153649 A1 * | 6/2009 | Hirooka et al. | 348/47 |
| 2009/0167897 A1 * | 7/2009 | Fujita | 348/240.1 |
| 2009/0167898 A1 * | 7/2009 | Iijima | 348/240.1 |
| 2009/0167899 A1 * | 7/2009 | Tsuda | 348/240.2 |
| 2009/0290046 A1 * | 11/2009 | Kita | 348/231.99 |
| 2010/0013960 A1 * | 1/2010 | Ishii | 348/240.1 |
| 2010/0079623 A1 * | 4/2010 | Tomita | 348/240.99 |
| 2010/0103291 A1 * | 4/2010 | Koyama et al. | 348/240.3 |
| 2010/0149378 A1 * | 6/2010 | Suzuki | 348/231.99 |
| 2010/0157103 A1 * | 6/2010 | LeGall et al. | 348/240.1 |
| 2011/0013049 A1 * | 1/2011 | Thorn | 348/240.3 |
| 2011/0043662 A1 * | 2/2011 | Kim | 348/240.2 |
| 2011/0109771 A1 * | 5/2011 | Onomura | 348/240.3 |

FOREIGN PATENT DOCUMENTS

| | | |
|---|---|---|
| JP | 2004-072206 A | 3/2004 |
| JP | 2006-197055 A | 7/2006 |
| JP | 2006-238326 A | 9/2006 |
| JP | 2007-096588 A | 4/2007 |
| JP | 2007-208937 A | 8/2007 |
| JP | 2008-067218 A | 3/2008 |
| JP | 2008-096584 A | 4/2008 |
| JP | 2008-131265 A | 6/2008 |
| JP | 2008-295107 A | 12/2008 |

* cited by examiner

__IMAGING APPARATUS HAVING A ZOOM FUNCTION__

CROSS-REFERENCE TO RELATED APPLICATION

This application is based upon and claims the benefit of priority from the prior Japanese Patent Application No. 2009-078176, filed Mar. 27, 2009, the entire contents of which is incorporated herein by reference.

BACKGROUND OF THE INVENTION

1. Field of the Invention

The present invention relates to an imaging apparatus having a zoom function, a controlling method thereof, and a control program (recording medium) thereof.

2. Description of the Related Art

Conventionally, there has been a problem in a camera mounted with a high-magnification zoom lens having, for example, a magnification of 10× or 20×. In shooting a subject from a distance with the zoom lens positioned at the wide-angle end side, the coverage range tends to shift as the zoom lens zooms in toward the telephoto side because of camera shake. As a result, the subject is no longer included in the coverage range and the camera loses sight of the subject.

Even when an attempt is made to once again place the subject within the coverage range, the further the zoom lens is positioned towards the telephoto side, the more difficult it is to determine the current imaging area. Accordingly, the position of the subject needs to be reconfirmed by the zoom lens being returned to the wide-angle side, or the subject is searched by trial and error with the zoom lens still being positioned on the telephoto side.

To solve this problem, a technology has been proposed (for example, Japanese Patent Application Laid-Open (Kokai) Publication No. 2007-208937) in which the position of the camera itself is measured by a global positioning system (GPS) receiving device, the shooting direction is measured by a direction sensor, and the shooting angle is measured by a zoom factor of the lens. Whether or not a subject is within the angle-of-view is judged based on the measured values, and a shooting guide or marker indicating the direction of the subject is displayed on a screen of the monitor.

However, there is a problem in a digital camera adopting the above-described conventional technology in that a GPS receiving device, a direction sensor, and the like are required to be mounted. This affects the reduction of product size, and since a power supply for driving each device is required, the battery life is shortened if it is a battery-powered digital camera.

SUMMARY OF THE INVENTION

The present invention has been conceived to solve the above-described problems. An object of the present invention is to provide an imaging apparatus and an imaging method which enable the user to easily confirm an imaging subject by preventing the user from losing sight thereof when the zoom lens zooms in from the wide-angle side to the telephoto side, without affecting the reduction of product size or shortening the battery life.

In order to achieve the above-described object, in accordance with one aspect of the present invention, there is provided an imaging apparatus comprising an imaging unit; a zoom unit for changing a zoom magnification during imaging by the imaging unit; a display unit for displaying an image imaged by the imaging unit in real time; a wide-angle image acquisition unit for acquiring and holding a wide-angle image that is an image imaged by the imaging unit when the zoom magnification is a low magnification; and a display control unit for displaying the wide-angle image held by the wide-angle image acquiring unit in the display unit upon a telephoto image that is an image imaged by the imaging unit when the zoom magnification is a magnification higher than the low magnification being displayed in the display unit in real time.

In accordance with another aspect of the present invention, there is provided an imaging method using an imaging apparatus including an imaging unit, a zoom unit for changing a zoom magnification during imaging by the imaging unit, and a display unit for displaying an image imaged by the imaging unit in real time, comprising: a wide-angle image acquiring step of acquiring and holding a wide-angle image that is an image imaged by the imaging unit when the zoom magnification is a low magnification; and a display controlling step of displaying the wide-angle image held in the wide-angle image acquiring step in the display unit upon a telephoto image that is an image imaged by the imaging unit when the zoom magnification is a magnification higher than the low magnification being displayed in the display unit in real time.

In accordance with another aspect of the present invention, there is provided a computer-readable storage medium having stored thereon a program that is executable by a computer in an imaging apparatus including an imaging unit, a zoom unit for changing a zoom magnification during imaging by the imaging unit, and a display unit for displaying an image imaged by the imaging unit in real time, the program being executable by the computer to perform a process comprising: wide-angle image acquiring processing for acquiring and holding a wide-angle image that is an image imaged by the imaging unit when the zoom magnification is a low magnification; and display controlling processing for displaying the wide-angle image held in the wide-angle image acquiring processing in the display unit upon a telephoto image that is an image imaged by the imaging unit when the zoom magnification is a magnification higher than the low magnification being displayed in the display unit in real time.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

A. Configuration According to the Embodiment

Figure 1:
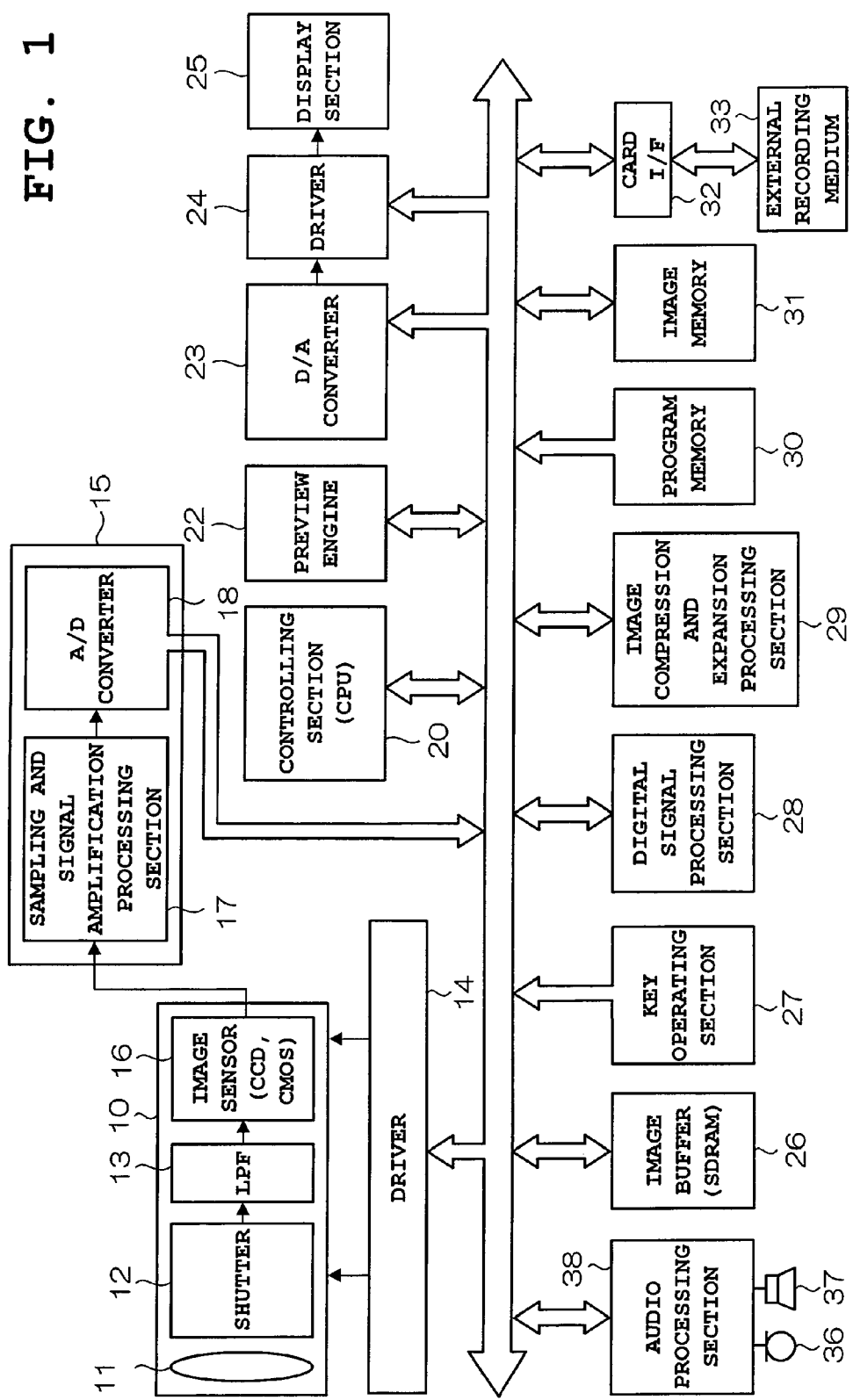
FIG. 1 is a block diagram showing a configuration of a digital camera according to an embodiment of the present invention.

FIG. 1 is a block diagram showing a configuration of a digital camera (imaging apparatus) according to an embodiment of the present invention.

In FIG. 1, an image acquiring section 10 (imaging unit) includes a lens 11, a shutter 12, a low-pass filter (LPF) 13, and an image sensor (charge-coupled device [CCD] or complementary metal-oxide semiconductor [CMOS]) 16. The lens 11, which is an ordinary optical lens constituted by a lens group in which aspherical lenses are stacked, is capable of optical zoom. The zoom magnification ratio of the lens 11 can be arbitrarily changed in accordance with an instruction given by user operation. The shutter 12 is a so-called mechanical shutter operated by a driver 14 driven by a controlling section 20 when a shutter button is operated. Depending on the digital camera, the mechanical shutter may not be included. When the digital camera is of a type including a retractable lens structure or mechanical zoom, the driver 14 also drives and controls these features. The LPF 13 is a crystal low-pass filter provided to prevent the occurrence of moire. The image sensor 16 forms a subject image (image) and converts the light intensity of each red, green, and blue (RGB) color into a current value.

Next, an analog signal processing section 15 includes a sampling and signal amplification processing section 17 and an analog-to-digital (A/D) converter 18. The sampling and signal amplification processing section 17 performs a correlated double sampling processing and a signal amplification processing to reduce noise and color unevenness. The A/D converter 18, also referred to as an analog front-end, converts sampled and amplified analog signals into digital signals (converts signals for each RGB or CMYG color into 12-bit data and outputs the 12-bit data over a bus line).

Next, the controlling section (central processing unit [CPU]) 20 runs programs stored in a program memory 30 described hereafter and controls the overall digital camera (imaging apparatus). In particular, according to the embodiment, an image captured at low magnification within the variable range of zoom magnification where magnification is relatively low is recorded and stored as a wide-angle image (guidance image) in advance, and during a live-view display (monitor display) at high magnification where magnification is relatively higher than the low magnification, the recorded and stored guidance image (wide-angle image) is displayed, and a position corresponding to a current telephoto image is displayed to be identifiable within the guidance image. As a result, a current coverage range is easily grasped even at high magnification, and a desired subject is easily included within the angle-of-view.

Here, the controlling section (CPU) 20 actualizes functions of a wide-angle image acquisition unit, a display control unit, a desired imaging position designation unit, a size designation unit, and a display position designation unit.

A preview engine 22 performs decimation processing for displaying in a display section 25 digital data inputted via the image acquiring section 10 and the analog signal processing section 15 in image recording mode (also referred to as recording mode or imaging mode), or digital data stored in an image buffer 26 and digital data stored in an image memory 31 immediately after the detection of a shutter operation.

A digital-to-analog (D/A) converter 23 converts digital data on which the preview engine 22 has performed the decimation processing, and outputs the converted digital data to a driver 24. The driver 24 includes a buffer area for temporarily storing therein digital data displayed in the display section 25, and drives the display section 25 based on control signals inputted via a key operating section 27 and the controlling section 20. The display section 25 (display unit) is made of color thin-film transistor (TFT) liquid crystal or super twisted nematic (STN) liquid crystal, and displays a preview image, captured image data, a setting menu, etc.

An image buffer 26 temporarily stores digital data immediately after imaging which has been inputted via the analog signal processing section 15 or a digital signal processing section 28, until the digital data is sent to the digital signal processing section 28. The key operating section 27 includes a shutter button 7 and various operating keys such as a recording/playback mode switching key, a cross-shaped key, and a menu key. The digital signal processing section 28 performs white balance processing, color processing, tone processing, and edge enhancement on digital data (uncompressed raw image data) inputted via the analog signal processing section 15. An image compression and expansion processing section 29 compression-encodes digital data (uncompressed raw image data) inputted via the digital signal processing section 28 to a joint photographic experts group (JPEG) format. In playback mode, the image compression and expansion processing section 29 expands a JPEG file.

Here, the key operating section 27, the lens 11, the driver 14, and the controlling section (CPU) 20 actualize functions of a zoom unit.

The program memory 30 stores various programs and the like which are loaded by the controlling section 20. The image memory 31 is used to record captured image data. A card interface (I/F) 32 controls data exchange between an external recording medium 33 and the imaging apparatus. The external recording medium 33 is, for example, a CompactFlash (registered trademark), a memory stick, or a secure digital (SD) card.

A microphone 36 is used to input audio in shooting a moving image and the like. A speaker 37 outputs audio during the playback of a moving image and the like. An audio processing section 38 performs encoding (compression) and decoding (expansion) using a predetermined codec, thereby converting audio data to be outputted from the speaker 37 to analog signals, converting audio data from the microphone 36 to digital signals, and the like.

B. Operations of the Embodiment

Next, operations of the above-described embodiment will be described.

Figure 2:
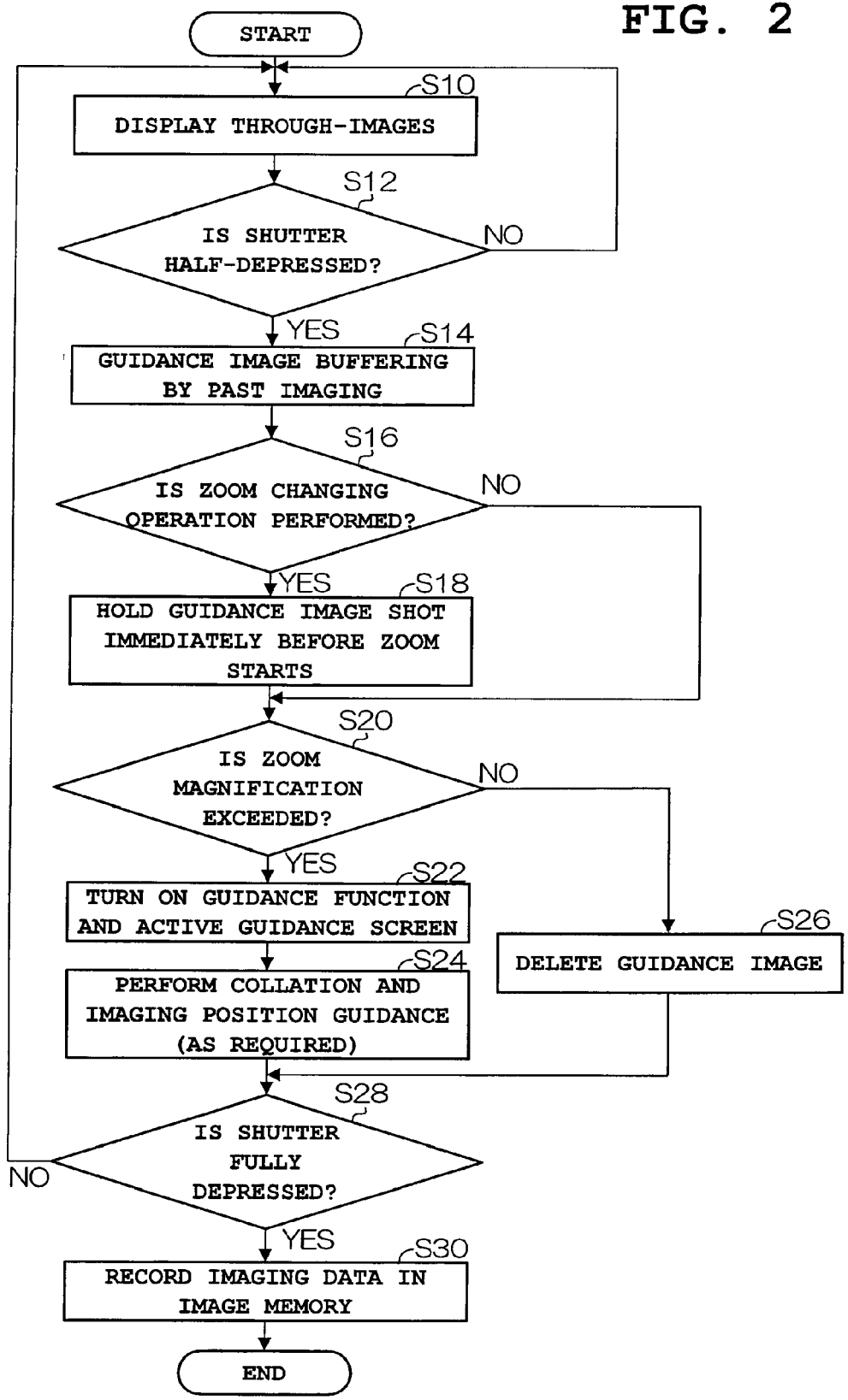
FIG. 2 is a flowchart explaining operations of the digital camera according to the embodiment.

FIG. 2 is a flowchart explaining operations of the digital camera according to the embodiment.

First, in an imaging standby state, the controlling section (CPU) 20 displays images acquired by sequentially imaging by the image acquiring section 10 as live-view images (through-images) (Step S10). The controlling section (CPU) 20 then judges whether or not the shutter 12 has been half-depressed. When judged that the shutter 12 has not been half-depressed, the controlling section (CPU) 20 returns to Step S10 and continues displaying live-view images.

Conversely, when judged that the shutter 12 has been half-depressed, the controlling section (CPU) 20 temporarily records and stores a predetermined number of live-view images while sequentially acquiring current live-view images (wide-angle images before zoom) at a predetermined frame rate (Step S14). In this instance, these images are cyclically recorded such that recorded images are discarded in chronological order from the oldest image (a guidance image buffering operation by past imaging). Next, the controlling section (CPU) 20 judges whether or not a zoom changing operation has been performed (Step S16). When judged that a zoom changing operation has been performed, the controlling section (CPU) 20 holds image data (wide-angle image) captured immediately before zoom is started as data of a guidance image, from among the above-described temporarily stored images (Step S18). As a result, when a zoom operation described hereafter is performed, the controlling section (CPU) 20 is able to acquire the image data captured immediately before the zoom operation is started or, in other words, acquire the guidance image (wide-angle image) captured before zooming from the temporarily stored image data. When judged that a zoom changing operation has not been performed, the controlling section (CPU) 20 proceeds to a subsequent step without performing any operations.

In the above-described processing, a guidance image (wide-angle image) captured before zooming, which is image data captured immediately before a zoom operation is started, is acquired as a result of a guidance image buffering operation by past imaging. However, a guidance image (wide-angle image) captured after zooming, which is image data captured immediately after a zooming operation is started, may be acquired without a guidance image buffering operation by past imaging.

Next, the controlling section (CPU) 20 judges whether or not the zoom magnification has exceeded a predetermined magnification (such as 3×) (Step S20). When judged that the zoom magnification has exceeded the predetermined magnification, a guidance function is turned ON and a guidance screen is activated (Step S22). Next, collation and imaging position guidance is performed as required (Step S24).

In the above-described processing, for example, whether or not the zoom magnification has exceeded 3× is judged. However, rather than an absolute zoom magnification, whether or not the relative amount of change from the zoom magnification before change has exceeded a predetermined magnification may be judged.

Next, the controlling section (CPU) 20 displays the guidance image (low-magnification, wide-angle image), which has been captured before the zoom operation is started, acquired at Step S18 in the display section 25 as guidance screen. In addition, the controlling section (CPU) 20 displays a position corresponding to a current telephoto image to be identifiable within the guidance image. Note that various display configurations can be conceived regarding the display configuration of the guidance screen and the imaging position guidance, and specific examples thereof will be described later.

Conversely, when judged that the zoom magnification has not exceeded the predetermined magnification, the controlling section (CPU) 20 deletes the guidance image. Alternatively, when judged that the magnification has been changed from a high magnification to the predetermined magnification or lower, the controlling section (CPU) 20 stops the guidance screen and deletes the guidance image (Step S26). Next, when either the collation and imaging position guidance processing or the guidance image deletion processing is performed, the controlling section (CPU) 20 judges whether or not the shutter 12 has been fully depressed (Step S28). When judged that the shutter 12 has not been fully depressed, the controlling section (CPU) 20 returns to Step S10 and repeats the above-described processing.

Therefore, when the digital camera is pointed at an arbitrary direction with the shutter 12 being half-depressed by the user after the zooming magnification exceeds the predetermined magnification, image data imaged by telephoto imaging after the zoom operation is displayed as through-images in real time. In addition, the guidance image (wide-angle image) captured before the zoom operation (or immediately after the zoom operation) is displayed within the guidance screen, and a position corresponding to a current telephoto image is displayed to be identifiable within the guidance image. Accordingly, the user is able to easily grasp a current coverage range even when shooting with high magnification zoom and to easily include a desired subject within the angle-of-view.

Conversely, when judged that the shutter 12 has been fully depressed, the controlling section (CPU) 20 records image data shot thereby in the image memory 31 (Step S30).

Figure 3:
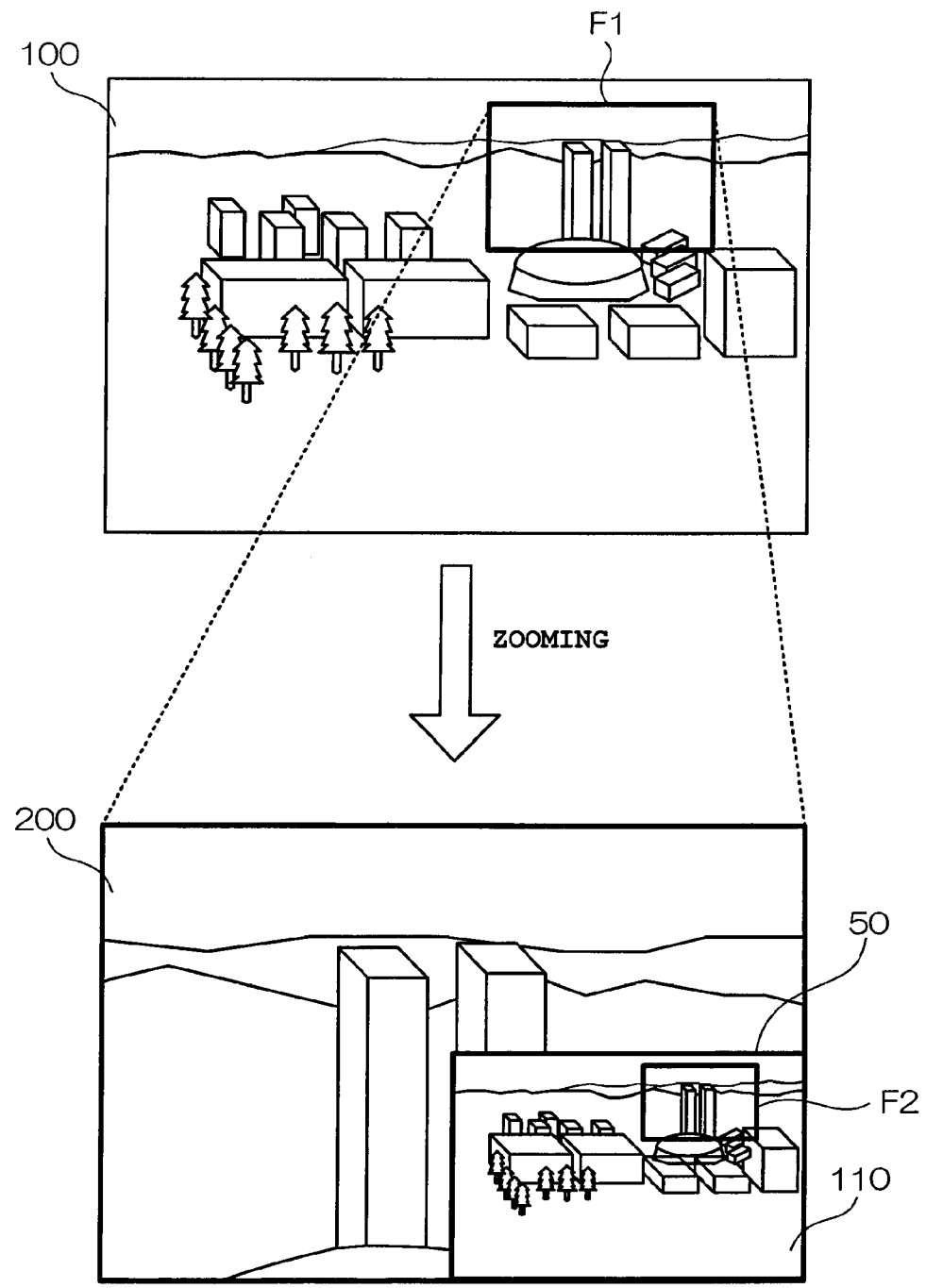
FIG. 3 is a schematic diagram showing a display example of a guidance screen according to the embodiment.

FIG. 3 is a schematic diagram showing an example of a display example of the above-described guidance screen according to the embodiment. When a zoom operation in which an area indicated by a frame F1 is the angle-of-view is performed on a wide-angle image 100 during wide-angle imaging, image data (high magnification) 200 imaged after the zoom operation is displayed in the display section 25, and guidance image data (wide-angle image) 110 captured before the zoom operation and a frame F2 indicating a position corresponding to the current telephoto image are displayed within a guidance screen 50 with being superimposed on the through-image.

Figure 4:
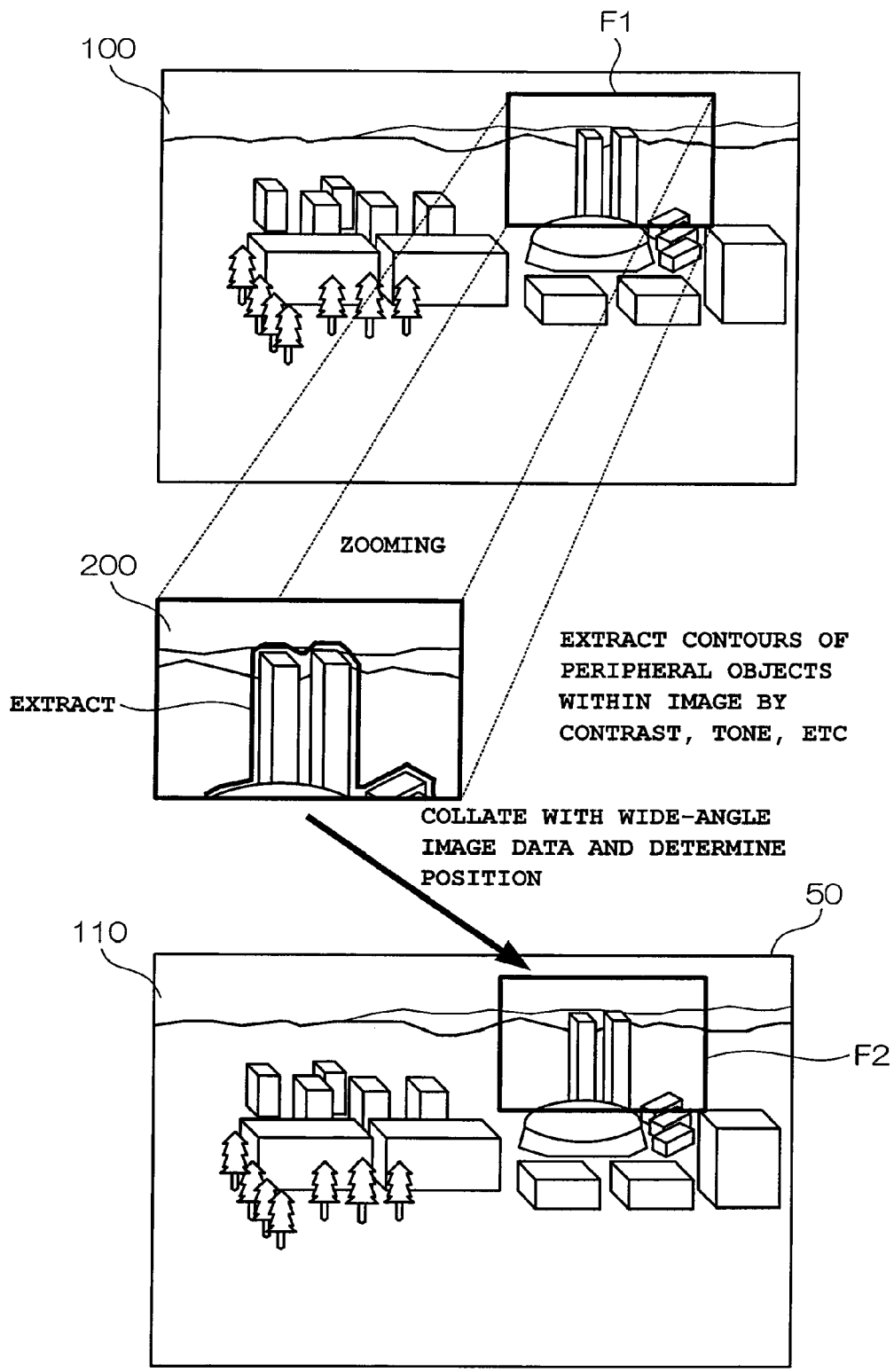
FIG. 4 is a conceptual diagram explaining a collation and imaging position guidance processing according to the embodiment.

FIG. 4 is a conceptual diagram explaining the collation and imaging position guidance processing according to the embodiment. In the collation and imaging position guidance processing, the contours of peripheral objects within the image data 200 imaged after the zoom operation are extracted based on the contrast, color tone, or the like from the image data 200, and collated with the guidance image data (wide-angle image) 110 captured before the zoom operation for use as a guide, so that a corresponding area is identified. As a result, it can be determined which area within the image (wide-angle) 110 captured before the zoom operation corresponds to the image (telephoto) 200 imaged after the zoom operation. Accordingly, the frame F2 indicating the position corresponding to the image data 200 imaged after the zoom operation can be displayed to be identifiable within the guidance image data (wide-angle) 110 captured before the zoom operation.

Figure 5:
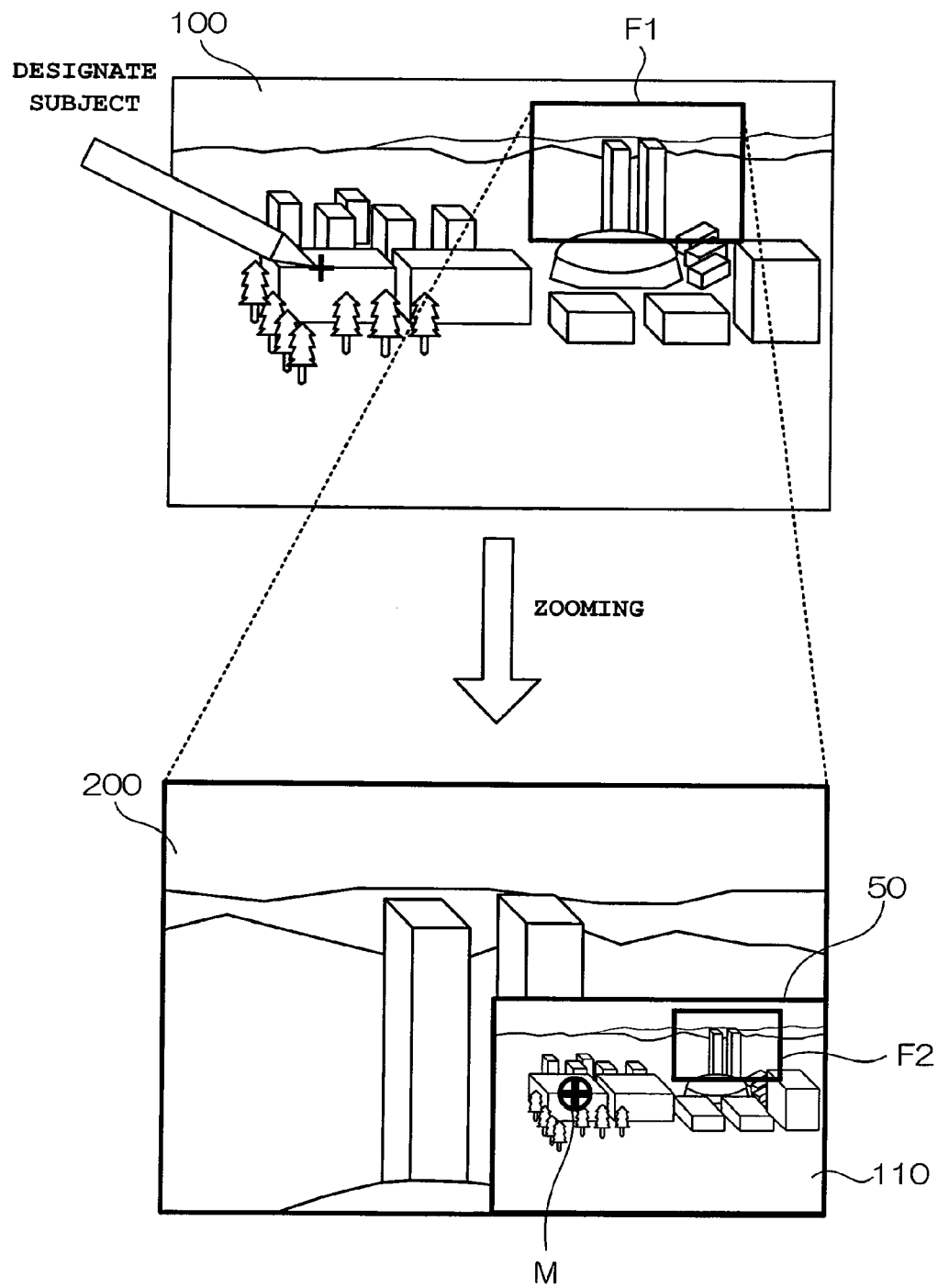
FIG. 5 is a schematic diagram showing an operation example and a display example when the designation of a desired subject position is made possible in the embodiment.

FIG. 5 is a schematic diagram showing an operation example and a display example when the designation of a desired subject position is made possible in the embodiment. In addition to the above-described processing, processing may be performed in which, when a desired subject to be zoomed-in and shot within the through-image 100 imaged with the lens 11 being positioned on the wide-angle side is designated through the use of a touch panel that is mounted on the front surface of the display section 25, the designated position is displayed in the form of a graphic such as a mark M to be identifiable within the guidance screen 50 activated after the zoom operation. Note that the position of the designated position within the through-image 100 imaged with the lens 11 being positioned on the wide-angle side may be determined and displayed to be identifiable by the above-described collation and imaging position guidance processing.

FIG. 6A, FIG. 6B, FIG. 6C, FIG. 7, and FIG. 8 are schematic diagrams showing display examples of the guidance screen according to the embodiment.

Figure 6A:
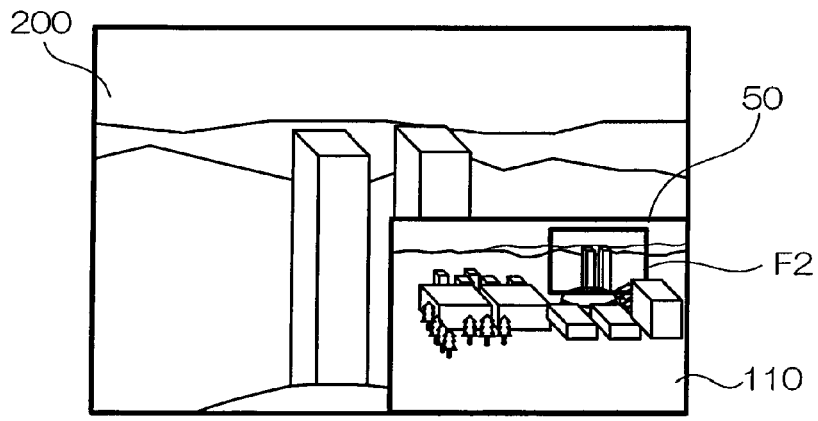
FIG. 6A, FIG. 6B, and FIG. 6C are schematic diagrams showing a display example of the guidance screen according to the embodiment.
Figure 6B:
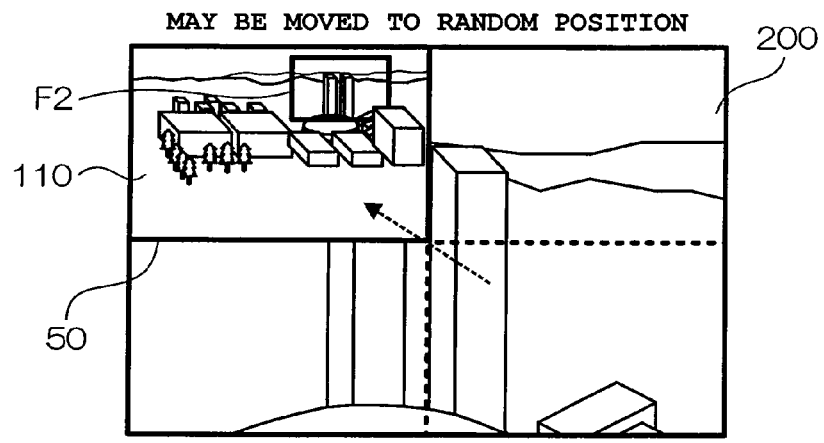
Figure 6C:
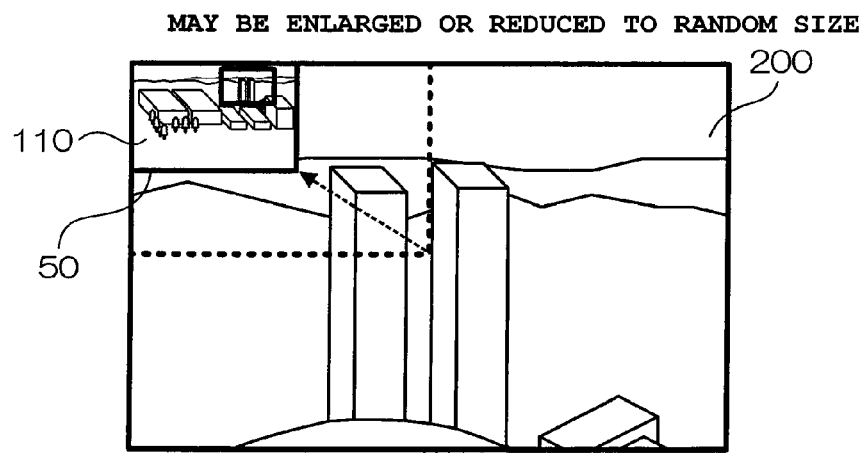

As referred to above, various display configurations can be conceived regarding the display configuration of the guidance screen. In the example shown in FIG. 6A, the guidance screen 50 is displayed with being superimposed on the through-image 200, and as shown in FIG. 6B, the position of the guidance screen 50 may be moved arbitrarily by user designation such as through the use of a cursor button or by the touch panel being touched. In addition, as shown in FIG. 6C, the size of the guidance screen 50 may be changed (enlarged or reduced) by a corner section or a frame portion of the guidance screen 50 being dragged.

Figure 7:
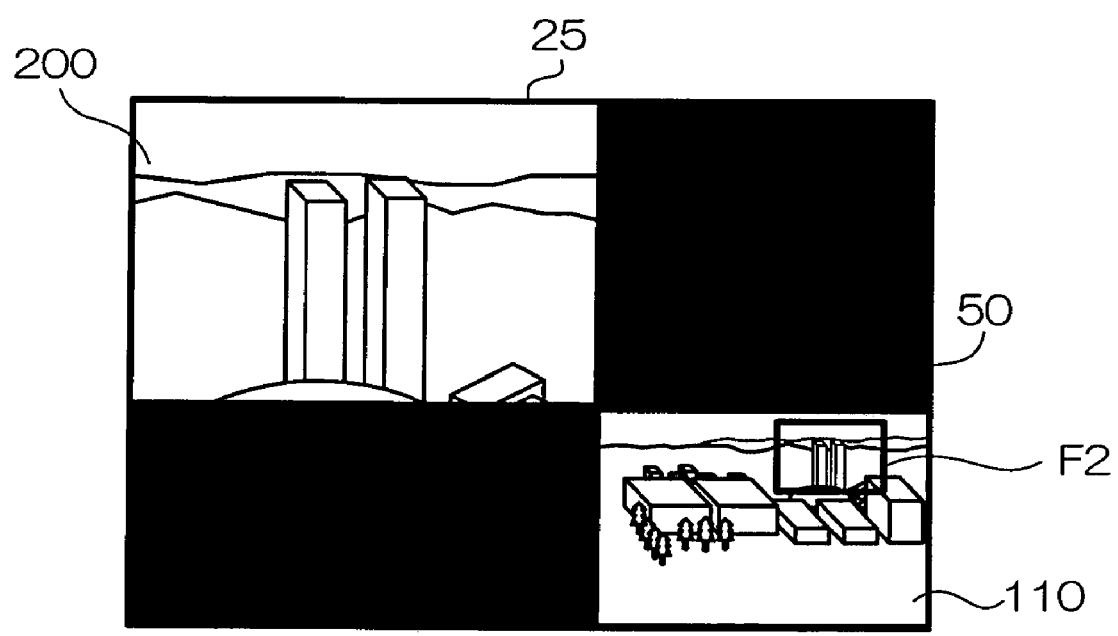
FIG. 7 is a schematic diagram showing a display example of the guidance screen according to the embodiment.

Moreover, as the example shown in FIG. 7, the through-image being imaged may be reduced and the guidance screen 50 may be displayed next to the through-image so as not to overlap. As described above, the size (ratio to the through-image) and the position of the guidance screen 50 may be changed arbitrarily by user operation.

Figure 8:
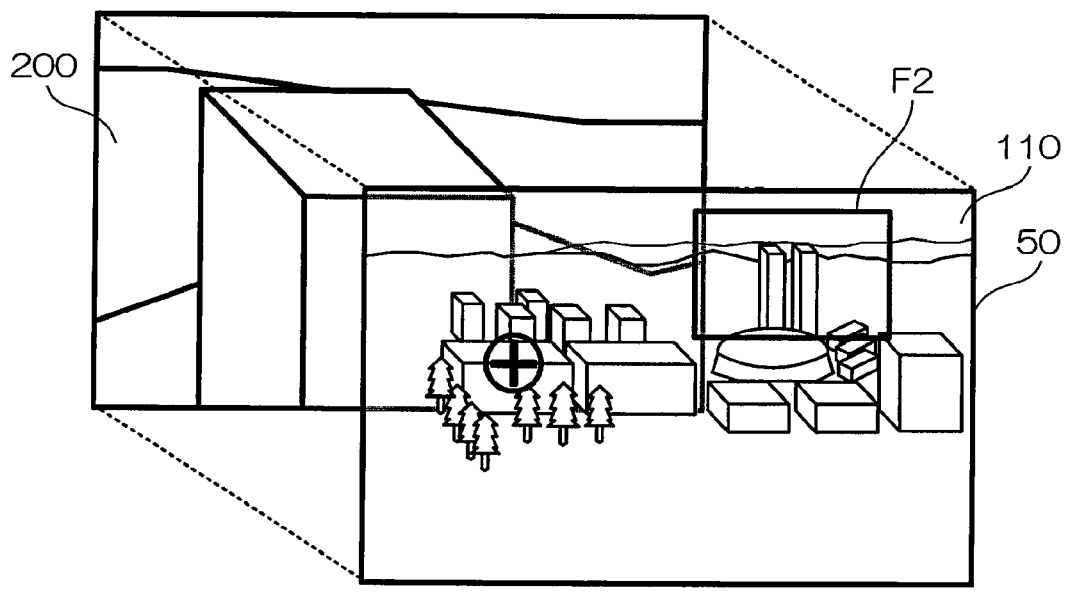
FIG. 8 is a schematic diagram showing a display example of the guidance screen according to the embodiment.

Furthermore, as the example shown in FIG. 8, the guidance screen 50 may be translucent and displayed with being superimposed on the through-image being imaged. In this case, the degree of transparency of the guidance screen 50 may be changed arbitrarily by user operation.

In the above-described embodiment, the present invention has been described based on a specific digital camera configuration and specific processing performed by a computer included in the digital camera. However, configurations and processing that are exactly the same as the specific configurations and processing described herein are not necessarily required to achieve the effects of the present invention such as those described above. It is only required that each of the following functions actualized by some or a combination of these configurations and processing are included.

Each function may be configured so as to correspond to a hardware configuration such as a specific electronic circuit, or actualized by a partial processing routine of a program run by a single general-use CPU.

The functions (configurations and processing) required in the present invention are, for example, an imaging means (imaging section and imaging processing); a zoom means (zoom section and zoom processing) for changing the zoom magnification during imaging by the imaging means; a display means (display section and display processing) for displaying an image imaged by the imaging means in real time; a wide-angle image acquisition means (wide-angle image acquiring section and wide-angle image acquiring processing) for acquiring and holding a wide-angle image that is an image imaged by the imaging means when the zoom magnification is a low magnification; and a display control means (display controlling section and display controlling processing) for displaying the wide-angle image held by the wide-angle image acquisition means in the display means, upon a telephoto image that is an image imaged by the imaging means when the zoom magnification is a magnification higher than the low magnification being displayed in the display means in real time.

Also, the wide-bangle image acquisition means may acquire and hold, at a timing at which the zoom magnification starts to change from a low magnification to a high magnification, an image imaged by the imaging means immediately before or immediately after the timing as a wide-angle image.

In addition, the display control means may display in the display means the wide-angle image held by the wide-angle image acquisition means with the telephoto image at a timing at which the zoom magnification changes from a low magnification to a predetermined magnification.

Moreover, in addition to the wide-angle image held by the wide-angle image acquisition means, the display control means may display a position corresponding to a current telephoto image to be identifiable within the wide-angle image.

Furthermore, a desired imaging position designation means may be further included for designating a desired imaging position within a coverage range when the zoom magnification is a low magnification, and the display control means may display the desired imaging position to be identifiable within the wide-angle image based on the designation by the desired imaging position designation means.

Still further, the display control means may display in the display means the wide-angle image held by the wide-angle image acquisition means as a guidance image separated from the telephoto image with the telephoto image.

Yet still further, the display control means may display the guidance screen superimposed on a portion of the telephoto image.

Yet still further, the display control means may display the guidance screen next to the telephoto image.

Yet still further, a size designation means may be further included for designating the size of the guidance screen, and the display control means may include a guidance screen size changing means for changing the size of the guidance screen based on the designation by the size designation means.

Yet still further, a display position designation means may be further included for designating the display position of the guidance screen, and the display control means may include a guidance screen position changing means for changing the display position of the guidance screen based on the designation by the display position designation means.

Yet still further, the display control means may display the guidance screen in a translucent state superimposed on the telephoto image.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
an imaging unit;
a zoom unit for changing a zoom magnification by optical zoom during imaging by the imaging unit;
a display unit for displaying an image imaged by the imaging unit in real time;
a wide-angle image acquisition unit for acquiring and holding a wide-angle image that is an image imaged by the imaging unit when the zoom magnification by optical zoom is a low magnification; and
a display control unit for displaying, on the display unit, the wide-angle image held by the wide-angle image acquiring unit and a telephoto image, which is an image imaged by the imaging unit when the zoom magnification by optical zoom is changed to a magnification higher than the low magnification, wherein when a new telephoto image is imaged, the display of the telephoto image is updated, and the display of the wide-angle image is maintained without being updated.

2. The imaging apparatus according to claim 1, wherein the wide-angle image acquisition unit acquires and holds, at a timing at which the zoom magnification by optical zoom starts to change from a low magnification to a high magnification, an image imaged by the imaging unit immediately before or immediately after the timing as the wide-angle image; and wherein the display control unit maintains the display of the wide-angle image without performing imaging of a new wide-angle image and without updating of the display, during updating of the display of the telephoto image to display a plurality of telephoto images sequentially imaged at a different optical zoom magnifications.

3. The imaging apparatus according to claim 1, wherein the display control unit displays on the display unit the wide-angle image held by the wide-angle image acquisition unit with the telephoto image at a timing at which the zoom magnification by optical zoom changes from a low magnification to a predetermined magnification.

4. The imaging apparatus according to claim 1, wherein the display control unit displays, in addition to the wide-angle image held by the wide-angle image acquisition unit, a position corresponding to a current telephoto image to be identifiable within the wide-angle image.

5. The imaging apparatus according to claim 1, further comprising:

a desired imaging position designation unit for designating a desired imaging position within a coverage range when the zoom magnification by optical zoom is a low magnification;

wherein the display control unit displays the desired imaging position to be identifiable within the wide-angle image based on the designation by the desired imaging position designation unit.

6. The imaging apparatus according to claim 1, wherein the display control unit displays on the display unit the wide-angle image held by the wide-angle image acquisition unit as a guidance image separated from the telephoto image, with the telephoto image.

7. The imaging apparatus according claim 6, wherein the display control unit displays the guidance screen superimposed on a portion of the telephoto image.

8. The imaging apparatus according to claim 6, wherein the display control unit displays the guidance image next to the telephoto image.

9. The imaging apparatus according to claim 6, further comprising:

a size designation unit for designating a size of the guidance screen;

wherein the display control unit includes a guidance screen size changing unit for changing the size of the guidance screen based on the designation by the size designation unit.

10. The imaging apparatus according to claim 6, further comprising:

a display position designation unit for designating a display position of the guidance screen;

wherein the display control unit includes a guidance screen position changing unit for changing the display position of the guidance screen based on the designation by the display position designation unit.

11. The imaging apparatus according to claim 6, wherein the display control unit displays the guidance screen in a translucent state superimposed on the telephoto image.

12. An imaging method using an imaging apparatus including an imaging unit, a zoom unit for changing a zoom magnification by optical zoom during imaging by the imaging unit, and a display unit for displaying an image imaged by the imaging unit in real time, the method comprising:

a wide-angle image acquiring step of acquiring and holding a wide-angle image that is an image imaged by the imaging unit when the zoom magnification by optical zoom is a low magnification; and a display controlling step of displaying, on the display unit, the wide-angle image held in the wide-angle image acquiring step and a telephoto image, which is an image imaged by the imaging unit when the zoom magnification by optical zoom is changed to a magnification higher than the low magnification, wherein when a new telephoto image is imaged, the display of the telephoto image is updated, and the display of the wide-angle image is maintained without being updated.

13. A non-transitory computer-readable storage medium having stored thereon a program that is executable by a computer in an imaging apparatus including an imaging unit, a zoom unit for changing a zoom magnification by optical zoom during imaging by the imaging unit, and a display unit for displaying an image imaged by the imaging unit in real time, the program being executable by the computer to perform processes comprising:

a wide-angle image acquiring process for acquiring and holding a wide-angle image that is an image imaged by the imaging unit when the zoom magnification by optical zoom is a low magnification; and a display controlling process for displaying on the display unit the wide-angle image held in the wide-angle image acquiring processing in the display unit and a telephoto image, which is an image imaged by the imaging unit when the zoom magnification by optical zoom is changed to a magnification higher than the low magnification, wherein when a new telephoto image is imaged, the display of the telephoto image is updated, and the display of the wide-angle image is maintained without being updated.

* * * * *